Patented Nov. 20, 1951

2,575,352

UNITED STATES PATENT OFFICE 2,575,352

PHOSPHATES OF AMYLACEOUS POLYSACCHARIDES

Rolland L. Lohmar, Jr., Morton, Ill., assignor to the United States of America as represented by the Secretary of Agriculture No Drawing. Application March 25, 1949, Serial No. 83,532

20 Claims. (Cl. 260—233.5)

(Granted under the act of March 3, 1883, as amended April 30, 1928; 370 O. G. 757)

The invention herein described, if patented in any country, may be manufactured and used by or for the Government of the United States of America for governmental purposes throughout the world without the payment to me of any royalty thereon.

This invention relates to new compositions of matter, more particularly to phosphates of amylaceous polysaccharides, and moreover includes the corresponding salts thereof.

This invention has among its objects the provision of a phosphorylated starch or starch derivative which is insoluble in aqueous media that are neutral, weakly acidic, or weakly basic, the term "insoluble" referring to hot as well as cold media.

In the prior art there have been several reports on the preparation of phosphorylated starch derivatives. Kerb in Biochem. Zeits, 100, 3, (1919) reported the phosphorylation of soluble starch in aqueous solution. His product contained 1.7 percent P and was water soluble. His procedure involved phosphorylation with phosphorus oxychloride in chloroform. Samec et al. in Kolloidchemische Beihefte, 16, 89 (1922) prepared phosphorylated "erythroamylose" by a process similar to Kerb's. Both workers prepared the derivatives as the calcium salts. Conversion to the free acids resulted in water-soluble products. Phosphorylated starch has also been prepared enzymatically, the product containing up to 2 percent P and being soluble in dilute alkali.

Karrer et al., Helv. Chim. Acta, 26, 1296 (1943) reacted soluble starch with phosphorus oxychloride in dry pyridine, obtaining a phosphorylated product, soluble in water. These workers dried the starch over phosphorus pentoxide prior to phosphorylation.

We have found, in agreement with the prior art, that starch, phosphorylated in the usual way after drying over phosphorus pentoxide gives soluble products when reacted with phosphorus oxychloride in pyridine.

In contradistinction to the foregoing findings, we have discovered that amylaceous polysaccharides when given a previous treatment with pyridine and subsequently reacted with a phosphorylating agent produces insoluble phosphoric ester products. When the amylaceous polysaccharide is in the form of starch granules, the products are obtained as granules if known gelatinizing conditions are avoided in the process.

The pretreatment may be accomplished in a very simple manner, for example, starch may be dried by azeotropic distillation with pyridine or merely refluxed with pyridine. Moreover, starch previously dried over phosphorus pentoxide may be given a treatment with hot pyridine and subsequently phosphorylated, producing insoluble products. Pregelatinization of the starch by the action of hot water, or by other means, is not necessary to insure phosphorylation, although pregelatinized starches also may be phosphorylated according to the present invention to produce insoluble products. We have discovered, furthermore, that the presence of moisture in the phosphorylation reaction mixture, for example, the amount present at equilibrium with the atmosphere or less, does not interfere with the preparation of the insoluble products.

According to the present invention, an amylaceous polysaccharide is given a pretreatment with pyridine, then phosphorylated with a phosphorus oxyhalide in a pyridine medium. The pretreatment appears to activate the polysaccharide, thus materially enhancing its reactivity. The exact physico-chemical mechanism is not known, but is believed to involve surface phenomena.

The pyridine pretreatment may be carried out as discussed previously, but we have been successful in employing temperatures of 50° C. for 45 minutes or longer. At 100° C., a ten-minute period is ample. As the temperature of the pretreatment is increased the requisite time becomes shorter, until at the reflux point of the medium the time is reduced to an insignificant value. Moreover, the treatment may be accomplished at pressures below or above atmospheric. For convenience, we prefer temperatures of 100° to 115° C. at atmospheric conditions.

The term "amylaceous polysaccharide" as used herein is intended to mean polysaccharides, such as raw starches, for example, corn, potato, wheat, sweet potato, arrow root, rice, tapioca, canna, waxy maize, dasheen, and the like, gelatinized starches, soluble starches, horny starches, pregelatinized starches and pyrodextrins.

The preferred method of phosphorylation is by action of phosphorus oxychloride on the pretreated polysaccharide. Specifically, the material is placed in pyridine, traces of moisture eliminated by distillation of water-pyridine azeotrope, and phosphorus oxychloride added to the reaction mixture. An alternative and equally effective procedure is to reflux the pyridine starch mixture to accomplish pretreatment. The phosphorylation reaction is then carried out preferably by heating the reaction mixture to temperatures within the range of 40° to 115° C. The proportion of phosphorus oxychloride added may vary over a wide range, for example, from 30 percent to 400 percent by weight of the amylaceous material. The amount of phosphorus introduced likewise may vary widely, depending upon the amount of phosphorus oxychloride used and the time and temperature of reaction. For example, the final product may contain from 0.5 to 12 percent or more phosphorus by weight. The products so obtained are preferably treated with solutions of alkalies or salts to remove small amounts of pyridine. The products may be converted into any of a wide variety of salts, for example, by slurrying or washing them with soluble salt solutions by which procedure the cation is abstracted from the solution and becomes bound to the phosphorylated polysaccharide. Colored metallic ions give rise to colored products. For example, the copper salts of the phosphorylated polysaccharides are blue. The salts may also be prepared by neutralizing the phosphorylated polysaccharide with alkaline compounds, such as sodium hydroxide. Before conversion to salts, the products, behave as acids, the salts themselves being neutral in reaction. The cations may be removed by treating the salts with acids such as hydrochloric acid.

The new products are insoluble either in the form of their salts or as the free acid. They are remarkably resistant to swelling in hot water, and one of their most striking qualities is the ability of the salts to exchange cations. In fact, the salt products have cation exchange capacities which exceed those of some commonly used commercial resin-type cation exchangers. Furthermore, the insolubility of the products in cold or hot water or dilute acids or alkalies render the products advantageous as diluent powders for insecticide dusts and for other purposes where an insoluble water-resistant solid material is required. In finely powdered or granular form the products, being inert under the ordinary conditions of sterilization, are useful as dusting powders for rubber articles.

The invention is illustrated by the following specific examples.

Example 1

Corn starch (100 g.) was suspended in pyridine. The mixture was distilled until a substantial reduction in volume was effected. Phosphorus oxychloride (150 cc.) dissolved in dry pyridine was added slowly over a period of one to two hours. The reaction mixture was heated at 65° to 70° C. for several hours, cooled to 30° C. and filtered. The product was slurried in 1.5 liters of water, filtered and washed with 2 liters of water. The product was dried in a vacuum desiccator overnight, and then dried in a vacuum oven at 100° C. for 5 hours. The dried product retained the granular form of the original starch. It contained 2 percent moisture and weighed approximately 150 g. It contained 10.95 percent P, dry basis. An electrometric titration curve shows an inflection point near pH 7. The phosphorylated starch product showed little or no swelling when heated with water at 100° C.

Two additional experiments were carried out in accordance with the above procedure, but varying the temperature of phosphorylation. In the first the phosphorylation was effected at 40° C., and in the second at the boiling point of the medium. The products of both had physical and acidity characteristics similar to those described above. Both products retained the granular form of the original starch.

Example 2

Corn starch was treated in substantially the same manner as in Example 1, except that approximately one-fourth the quantity, i. e., 38 cc., phosphorus oxychloride was used. The product contained 4.7 percent phosphorus. It swelled to about twice its volume when heated with water at 100° C. but did not form a gel.

A phosphorylated starch (50 g.) made according to the procedure of this example was stirred in water and 5 percent sodium hydroxide solution was added until a pH of 8 was reached. The resulting sodium salt was washed and dried. It was a white powder similar in appearance to the free acid and was substantially neutral in reaction. It also retained the granular form of the original starch.

Example 3

A commercial hot-roll gelatinized starch (10 g.) was suspended in pyridine (150 cc.). The mixture was distilled until a substantial reduction in volume was effected. The mixture was cooled to about 30° C. Phosphorus oxychloride (15 cc.) was added and the mixture was heated to 70° C. for about 3½ hours. The product was isolated as in the above examples. Product of 15.4 grams, containing 10.5 percent P was obtained.

Example 4

Corn starch (10 g.) was thoroughly dried over phosphorus pentoxide, then suspended in pyridine (75 cc.). The mixture was refluxed for a short time, cooled, and phosphorus oxychloride (15 cc.) were added. The resulting mixture was heated at 70° C. for about 3½ hours. The product (16.5 g.) was isolated as in the previous examples. Its properties were substantially the same as the products of Example 1. This product also retained the granular form of the original starch.

Example 5

Corn starch (10 g.) was suspended in aqueous pyridine and gelatinized by heating to 100° C. The water was removed by azeotropic distillation with pyridine. The mixture was cooled and phosphorus oxychloride (15 cc.) was added. The mixture was heated at 65–70° C. for about 3 hours. The product (16.5 g.) was isolated as in the above examples. It swelled to between 150 and 175 percent of its volume in hot or cold water, but did not dissolve nor form a gel.

Example 6

Potato starch (10 g.) was suspended in pyridine (150 cc.). The mixture was distilled until a substantial reduction in volume was effected. The mixture was cooled to about 34° C. and phosphorus oxychloride (15 cc.) was added. The reaction mixture was heated under reflux for about 3½ hours. The product (16.2 g.) contained 10.1 percent P. The granular form of the original starch was retained.

Example 7

The procedure of Example 1 was repeated employing a corn starch pyrodextrin in place of the corn starch. The product was insoluble in hot water, cold water, or dilute acid or alkali. About 4 gram milliequivalents of sodium hydroxide were required to neutralize one gram of the product to the phenolphthalein end point.

Example 8

Commercial "soluble starch" (10 g.) was mixed with pyridine (150 cc.) and distillation was carried out until a substantial reduction in volume was effected. Phosphorus oxychloride (15 cc.) was added and the mixture was refluxed for 3½ hours. The product was filtered, washed, and dried. It weighed 16.4 grams and required 4.1 gram milliequivalents of sodium hydroxide to neutralize one gram. It was swollen slightly by the action of hot water, but did not dissolve. The granular form of the original starch was retained.

*Example 9*

Tapioca starch (10 g.) was mixed with pyridine (150 cc.) and distillation was carried out until a substantial reduction in volume was effected. Phosphorus oxychloride (15 cc.) was added and the mixture was refluxed for 3½ hours. The product was filtered, washed, and dried. It weighed 16.4 g. and required 3.6 gram milliequivalents of sodium hydroxide to neutralize one gram. It did not dissolve in hot water. The product retained the granular form of the original starch.

*Example 10*

A phosphorylated starch (25 g.), made according to the procedure in Example 1, was placed in a vertical column and a calcium chloride solution containing 2 g. calcium ion per liter was passed through. The calcium was removed from the column by passing through it a dilute hydrochloric acid solution. The material in the column was washed with water. This initial run served to remove pyridine present in the phosphorylated starch. More calcium chloride solution was passed through. The pH of the eluate was plotted against volume. Qualitative tests for calcium ion indicated that the eluate remained free of calcium ion until about 600 cc. of eluate were collected, at which time the pH began to increase. Nineteen additions and removals of calcium ion were made and in each case the curves were substantially the same.

Similar results were obtained when the product made according to Example 3 was used.

I claim:

1. A method for preparing phosphorous derivatives of amylaceous polysaccharides, which results in a phosphorylated polysaccharide that is insoluble in neutral, weakly acidic, and weakly basic hot and cold aqueous media and which is resistant to swelling in hot water, comprising: treating the amylaceous polysaccharide material with a medium substantially consisting of pyridine at a temperature within the range of 50° C. to 115° C. and reacting the thus treated material with a phosphorous oxyhalide in a medium comprising dry pyridine at a temperature within the range of 40° C. to 115° C. for a period of time in excess of 15 minutes and recovering the phosphorylated product.

2. Method of claim 1 in which the amylaceous polysaccharide is ungelatinized corn starch granules.

3. Method of claim 1 in which the amylaceous polysaccharide is potato starch.

4. Method of claim 1 in which the amylaceous polysaccharide is a soluble starch.

5. Method of claim 1 in which the amylaceous polysaccharide is tapioca starch.

6. Method of claim 1 in which the amylaceous polysaccharide is a pyrodextrin.

7. Method of claim 1 in which the phosphorylated product is converted into a salt by reaction with a soluble salt solution.

8. Method which comprises suspending 100 parts corn starch in a medium pyridine, substantially consisting of distilling the mixture until a substantial reduction in volume has been effected, adding 30 to 200 parts of phosphorous oxychloride, heating the reaction mixture to a temperature in the range of 40° C. to 115° C. for a period of time in excess of 15 minutes, recovering the phosphorylated product.

9. Method of claim 8 in which the product is converted into its alkali metal salt by neutralization with an alkali metal basic compound.

10. Phosphorylated starch resistant to swelling in hot water and having the granular form of the original starch granules and which is insoluble in neutral, weakly acidic, and weakly basic hot and cold aqueous media, said product being further defined as that prepared by the process of claim 1 from granular starch, and having from about 0.5 to 12 percent phosphorous by weight, dry basis.

11. A phosphorylated amylaceous polysaccharide which is resistant to swelling in hot water and is insoluble in neutral, weakly acidic, and weakly basic hot and cold aqueous medium, and has from about 0.5 to 12 percent phosphorus by weight, dry basis; said product being further defined as prepared by heating an amylaceous polysaccharide with pyridine at about 50° to 115° C. to enhance its reactivity and reacting it with phosphorous oxychloride at about 40° to 115° C.

12. Salts of the product of claim 10 which are insoluble as defined.

13. Salts of the product of claim 11 which are insoluble as defined.

14. Salts of the product of claim 10 in which the cation is a colored metallic ion, which are insoluble as defined.

15. A copper salt of the product of claim 11.

16. A sodium salt of the product of claim 11.

17. A method for preparing phosphorous derivatives of amylaceous polysaccharides which comprises treating starch granules with pyridine at a temperature within the range of 50°–115° C. and reacting the thus treated granules with a phosphorous oxyhalide in a medium comprising pyridine at a temperature within the range of 40°–115° C., while avoiding aqueous gelatinizing conditions, for a period of time in excess of 15 minutes and recovering the phosphorylated product as granules possessing the physical structure of the original starch granules.

18. In a method for preparing phosphorous derivatives of amylaceous polysaccarides comprising treating said material with a phosphorous oxyhalide in a medium comprising pyridine at a temperature within the range of 40°–115° C., the improvement which comprises rendering said material reactive toward phosphorylation by pretreatment with pyridine in the absence of moisture sufficient to cause gelatinization.

19. A product of the group consisting of a phosphorylated amylaceous polysaccharide which is resistant to swelling in hot water and is insoluble in neutral, weakly acidic, and weakly basic hot and cold aqueous medium, and has from about 0.5 to 12 percent phosphorus by weight, dry basis; said product being further defined as prepared by heating an amylaceous polysaccharide with pyridine at about 50° to 115° C. to enhance its reactivity and reacting it with phosphorous oxychloride at about 40° to 115° C.; and water-insoluble salts thereof.

20. A product of the group consisting of phosphorylated starch resistant to swelling in hot water and having the granular form of the original starch granules and which is insoluble in neutral, weakly acidic, and weakly basic hot and cold aqueous media, said product being further defined as that prepared by the process of claim 1 from granular starch, and having from about 0.5 to 12 percent phosphorous by weight, dry basis, and water-insoluble salts thereof.

ROLLAND L. LOHMAR, JR.

REFERENCES CITED

The following references are of record in the file of this patent:

UNITED STATES PATENTS

| Number | Name | Date |
|---|---|---|
| 1,129,321 | Euler-Chelpin | Feb. 23, 1915 |
| 2,372,337 | Pacsu et al. | Mar. 27, 1945 |

OTHER REFERENCES

Karrer et al.: Helv. Chim. Acta., vol. 26 (1943), pages 1296–1300, 1307–08.